US007917719B2

(12) United States Patent
Elhamias et al.

(10) Patent No.: US 7,917,719 B2
(45) Date of Patent: Mar. 29, 2011

(54) PORTABLE MODULE INTERFACE WITH TIMEOUT PREVENTION BY DUMMY BLOCKS

(75) Inventors: Reuven Elhamias, Sunnyvale, CA (US); David Zehavi, Newe Ziv (IL); Roni Barzilai, Cfar-Vradim (IL); Vivek Mani, Chicago, IL (US); Simon Stolero, Nahriya (IL)

(73) Assignee: SanDisk Corporation, Milpitas, CA (US)

( * ) Notice: Subject to any disclaimer, the term of this patent is extended or adjusted under 35 U.S.C. 154(b) by 636 days.

(21) Appl. No.: 11/566,685

(22) Filed: Dec. 4, 2006

(65) Prior Publication Data

US 2009/0164681 A1  Jun. 25, 2009

(51) Int. Cl.
G06F 12/00 (2006.01)

(52) U.S. Cl. ................................. 711/167
(58) Field of Classification Search .............. 711/167
See application file for complete search history.

(56) References Cited

U.S. PATENT DOCUMENTS

| | | | |
|---|---|---|---|
| 5,144,242 A | | 9/1992 | Zeilenga et al. |
| 5,258,952 A | | 11/1993 | Coker et al. |
| 5,263,151 A | * | 11/1993 | Ikeno .......................... 714/5 |
| 5,289,583 A | | 2/1994 | Fischer et al. |
| 5,623,637 A | * | 4/1997 | Jones et al. .................. 711/164 |
| 5,942,983 A | | 8/1999 | Iijima et al. |
| 6,044,431 A | * | 3/2000 | Greenwood et al. ......... 711/5 |
| 6,047,343 A | | 4/2000 | Olarig |
| 6,496,890 B1 | * | 12/2002 | Azevedo et al. ............ 710/110 |
| 7,036,020 B2 | | 4/2006 | Thibadeau |
| 7,188,202 B1 | * | 3/2007 | Dorr et al. .................. 710/220 |
| 7,215,771 B1 | | 5/2007 | Hamlin |
| 7,406,523 B1 | * | 7/2008 | Kruy et al. .................. 709/227 |
| 7,426,747 B2 | | 9/2008 | Thibadeau |
| 7,493,656 B2 | | 2/2009 | Goodwill et al. |

FOREIGN PATENT DOCUMENTS

| | | |
|---|---|---|
| JP | 07-028748 | 1/1995 |
| KR | 0398544 | 3/2004 |
| WO | WO 2004/105021 | 12/2004 |

OTHER PUBLICATIONS

International Search Report mailed May 19, 2008, for International Application No. PCT/US2007/024797.
Written Opinion of the International Searching Authority mailed on May 19, 2008, for International Application No. PCT/US2007/024797.
Office Action issued in U.S. Appl. No. 11/618,839 on May 11, 2009, 14 pages.
Office Action issued in U.S. Appl. No. 11/618,839 on Feb. 22, 2010, 14 pages.

* cited by examiner

*Primary Examiner* — Matt Kim
*Assistant Examiner* — Hamdy S Ahmed
(74) *Attorney, Agent, or Firm* — Brinks Hofer Gilson & Lione

(57) ABSTRACT

Methods and systems for working around the timeout limitations of physical interface standards for detachable modules. By use of dummy data blocks to keep the bus active, the bus timeout requirements (in either direction) can be spoofed, to thereby permit more complex processing operations to be performed that may exceed the bus timeout of a particular specification. A controller in the memory system deasserts the ready signal and holds the bus connecting the computer system in a "busy" state until the memory system is about to timeout. During a write operation, the controller receives dummy data blocks from the computer system before the write bus timeout period expires, causing the bus timeout period to be reset. During a read operation, the controller sends dummy data blocks to the computer system before the read bus timeout period expires, causing the bus timeout period to be reset.

26 Claims, 4 Drawing Sheets

PORTABLE MODULE INTERFACE WITH TIMEOUT PREVENTION BY DUMMY BLOCKS

BACKGROUND AND SUMMARY OF THE INVENTION

The present application relates to interfaces to portable electronic modules, and more particularly to architectures which add functionality into a rigidly predefined interface.

Detachable memory modules have become extremely important since the 1990s, and have taken over many of the robust portability niches which were previously satisfied by removable disks or by special backup media. Such modules typically include a block of memory (typically flash), plus a controller which operates I/O and control functions. As these memory modules have become more popular, their capacities have of course increased, and cost per bit has decreased. However, development has also led in at least two other important directions: First, an interface to such modules has also been designed into many portable electronics systems other than computers as such. (Examples of such systems include cameras and videorecorders, cell phones, personal digital assistant devices (PDAs), music and video players, and hybrids of these.) Second, higher level functionality has been designed into some memory modules, to provide functions (e.g. related to data security and protection) which go beyond simple read and write.

Several physical layer protocols have been used for such modules, including MMC, SD (and variations and descendents thereof), CF, Memory Stick, and USB among others. Many such protocols are designed for very robust operation, since detachable modules may be inserted or removed unpredictably. One of the features which assures robust operation is rigorous timeout rules. For example, the SD card physical layer specification explicitly requires that the read timeout for a standard capacity SD card must be no longer than 100 ms, and the write timeout no longer than 250 ms. (These requirements help to assure that the system does not "hang" or get stuck while a card access is in progress.) If the host does not get any response with the given timeout it is supposed to assume that the card is not going to respond and try to recover (e.g. reset the card, power cycle, reject, etc.). (See SD Specifications Part 1, Physical Layer Simplified Specification Version 2.00, at sections 4.6. 4.6.1, and 4.6.2. This entire document is hereby incorporated by reference.)

However, the timeout rules, which have helped to assure robust operation, can themselves cause difficulties as more functionality is designed into the module. Specifically, the read and write timeout requirements mean that a complicated data processing operation, such as a security validation, may not complete before a desired read or write operation times out.

The maximum timeout values are not necessarily easy to change. For example, the interface protocol rules may have been hard-wired into an FPGA or ASIC on the host side. This is a problem for introduction of advanced modules, since constraints hard-wired into legacy hardware cannot be avoided.

When a bus timeout occurs, the host initiates either a power cycle, a recovery process, a write abort or a power shutdown, which results in the operation in the card being aborted. However, problems arise when legitimate read/write operations timeout. This can occur when the card is performing operations that take more time to complete than the timeout period allows. Thus, existing portions of the given architecture prevent forward migration to more complex operations.

A particular area of pressure on removable memory development is in digital content protection. Extensive efforts have been devoted to allowing convenient sale, transport and use of copyrighted content, without allowing the copyrighted material to be freely distributed by users. One milestone in this direction was the Secure Digital Music Initiative (SDMI), which was launched by an industry forum of over 180 companies and organizations representing information technology, consumer electronics, security technology, content owners, and Internet service providers involved in protecting the security of digital music. Another milestone was UDAC-MB—Universal Distribution with Access Control—Media Base is protection technology that delivers content to a Content Protection Secure MultiMediaCard, or other media, providing a convenient and legal way for users to create, replay and exchange copies of the content. This technology is based on a method for independent delivery of a license key and encrypted content. UDAC-MB was generally followed by the Keitaide-Music (KdM) standard.

Another important step in content is the TrustedFlash™ architecture, which was announced in 2005 by SanDisk Corporation. TrustedFlash allows consumers to buy premium music, movies and games on flash memory cards for use interchangeably in mobile phones, laptop computers, PDAs and other portable devices. Music producers and movie studios will be able to release premium content on TrustedFlash products because it provides the superior security and digital rights management solutions that are required by these providers. Consumers will be able to download premium content from online digital music services through their mobile phone or PC.

In the TrustedFlash technology, the card itself acts as the manager of digital rights, thus giving consumers the freedom to transfer the card—and its content—to other supported devices without compromising its content protection system. TrustedFlash cards also function as regular cards in non-secure host devices.

TrustedFlash cards are highly secure, thanks to an onboard processor, a high-performance cryptographic engine and tamper-resistant technology that are designed to provide much higher level security than has previously existed on memory cards and on most consumer electronics devices, Cards built on the TrustedFlash platform will provide full digital rights management capabilities, supporting industry security standards such as both symmetric and asymmetric algorithms.

TrustedFlash is also expected to extend to mobile commerce applications and secure online financial transactions, such as credit card payments, mass-transit access and one-time password authentication.

Architectures for content protection will tend to require cryptographic algorithms, for content validation and for node validation, and/or restrictions on file access (e.g. for private key files), and/or file management overhead procedures which keep track of when a file has been "checked out" to a portable medium. All of this adds to processing overhead. In such systems, this means that data exchange with a portable data module becomes much more complicated than simple read or write operations.

To implement advanced content-protection features, the data module should be able to hold and maintain a sophisticated high-integrity database. In such a database architecture, full integrity-checking may be necessary with EVERY access. Since cryptographic computations are typically needed for the integrity checks, the overhead to operate such a database can be severe. Thus a read or write to such an advanced memory module is only superficially simple, and substantial computing may have to be completed, on the card side of the interface, for each such access. This added overhead can cause problems with the fixed timeouts.

Much more information on content protection and mobile data interfacing can be found on the following websites, all of which (in their versions as of the filing date of the present application) are hereby incorporated by reference: http://www.keitaide-music.org/; http://www.mmca.org/technology/; http://www.sdcard.org/; http://sdmi.org/.

Additional information on security applications can be found in U.S. application Ser. No. 11/557,028 filed on Nov. 6, 2006, and in other materials cited therein, all of which are hereby incorporated by reference.

Portable Module Interface with Timeout Prevention by Dummy Blocks

The present application discloses new approaches to complying with bus timeout requirements while adding higher level functionality, such as security functions, onto data transfer operations. This is accomplished, e.g., by including dummy operations in read and/or write operations, so that the bus timeouts do not interfere with numeric processing required for more complex functions. When the host launches a secure operation related to card interface, it can also program a number of dummy operations which is sufficient to avoid timeouts.

The disclosed innovations, in various embodiments, provide one or more of at least the following advantages:

Excess timeouts are avoided.
More complex functions can be added into existing interfaces.
When interface software is updated, new dummy-block-series parameters can be updated too, so that excess timeouts are avoided.
The fixed maximum timeout value is worked around, since a procedure which needs more time can simply program a number of dummy blocks to be pushed over the interface.
Improved security functions can be added into portable module interface definitions.
Portable modules containing advanced secure database functions can be accessed by legacy equipment.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION

The numerous innovative teachings of the present application will be described with particular reference to presently preferred embodiments (by way of example, and not of limitation).

In accordance with various embodiments of the invention, a system and method is described that enables a memory system (e.g. memory card) to exceed its write or read bus timeout specification.

Figure 1A:
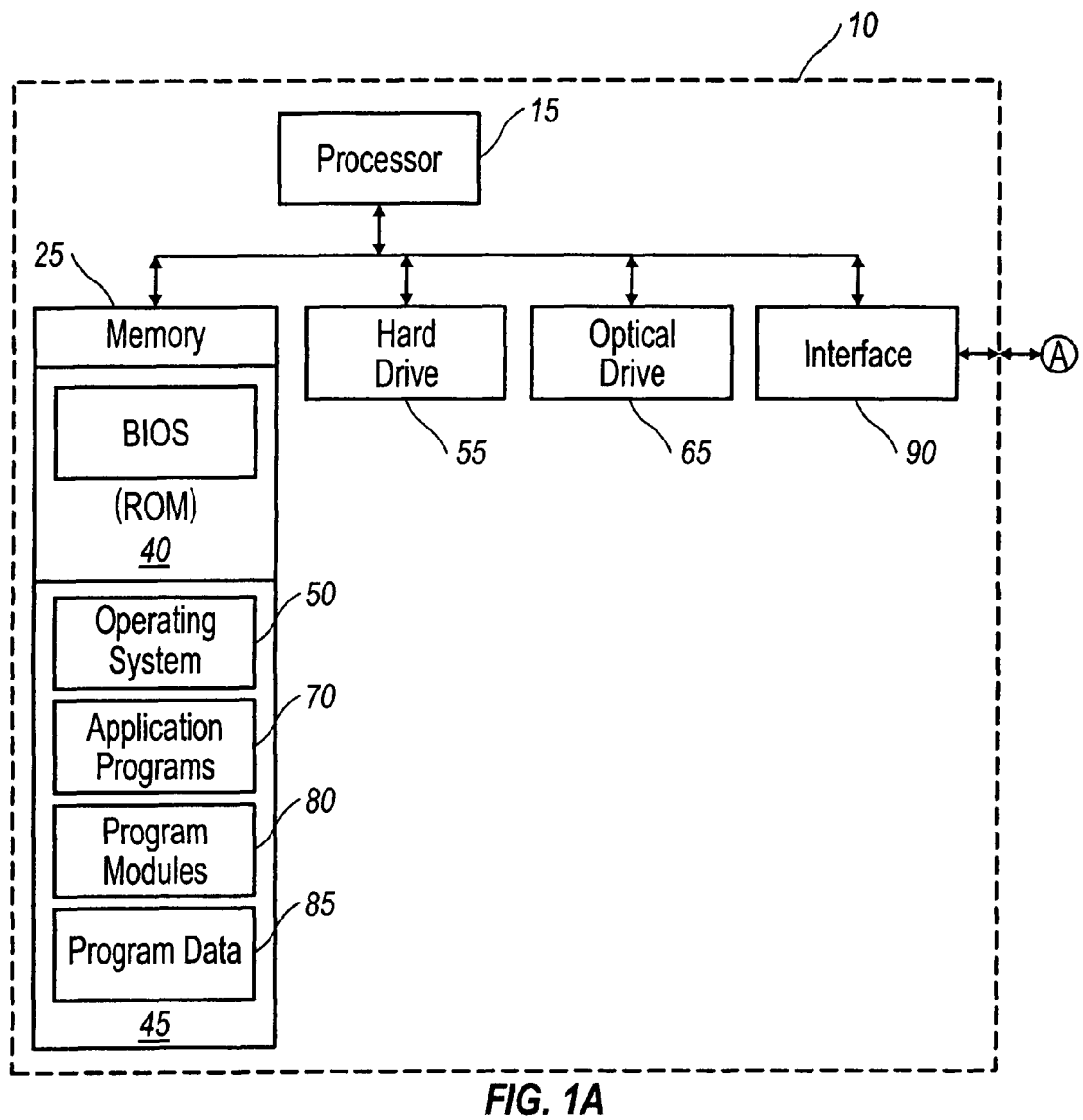
FIGS. 1(a) and 1(b) are block diagrams of sample computer system and memory system embodiments.

FIG. 1(a) is a diagram of a hardware and operating environment in conjunction with which embodiments of the invention may be practiced. This environment includes a general purpose computing device in the form of a computer system 10, including a processor 15, a memory 25, and a bus 30 that operatively couples various system components including memory 25 to processor 15. There may be only one or there may be more than one processor 15. The computer system 10 may be a conventional computer, a distributed computer, or any other type of computer; the invention is not so limited.

The bus 30 is connected to interface 90, which may be any of several types of bus structures including a memory bus or memory controller, a peripheral bus, and a local bus using any of a variety of bus architectures. Interface 90 includes a direct memory access (DMA) controller that transfers data and commands between memory 25 and I/O devices, such as memory system 100, shown in FIG. 1(b). The memory 25 includes read only memory (ROM) 40 having a basic input/output system (BIOS) 50 and random access memory (RAM) 45. RAM 45 may contain at various times operating system 70, application programs 75, program data 85 and program modules 80 including drivers which are discussed in more detail below.

Memory systems 100 as described above may be functionally represented as in FIG. 1(b). A non-volatile memory system 100 typically includes a flash memory array 140 and a controller 105. Memory cell array 140 may be flash, or may be some other type of non-volatile memory. User data is transferred between controller 105 and memory cell array 140.

Controller 105, depending on the particular embodiment of the present invention, includes e.g. the following: a processor 110, a timer 115, a read only memory (ROM) 135, and a random access memory (RAM) 120. Although timer 115 is indicated as a hardware block in FIG. 1(b), it can also be implemented in code stored within controller 105 or implemented as a combination of hardware and code. RAM 120 can store the firmware and software accessed by processor 110 to control the operation of memory system 100.

Controller 105 also includes a flash interface 125, which includes a direct memory access (DMA) engine, and host interface 130, which also includes a direct memory access (DMA) engine. The responsibilities of flash interface 125 and host interface 130 include managing and controlling communications and transfers between controller 105 and memory cell array(s) 140 and between controller 105 and computer system 10, respectively.

Specifically, the DMA engine in flash interface 125 is configured to manage and control the transfer of data to and from the RAM 120 and to or from memory cell array 140. The DMA engine in host interface 130 is configured to manage and control the transfer of data to or from the computer system 10 and to or from RAM 120. Controller 105 is configured so that operations within memory system 100 occur asynchronously with the operations on its bus. In one embodiment of the present invention, the DMA engine in host interface 130 is configured to control the bus, for example, by asserting or deasserting a status signal, such as a ready signal. When memory system 100 is ready to be accessed, the ready signal is asserted. Conversely, when memory system 100 is busy processing a command or performing operations, the ready signal is deasserted. Computer system 10 and memory system 100 embody the principles of the invention. In accordance with the principles of the invention, memory system 100 can perform, for example, read and write operations that can exceed the bus timeout period of its particular specification or protocol. In this embodiment of the present invention, memory system 100 is based on the SD Card specification. Thus, computer system 10 and memory system 100 are both configured to conform to the SD Card specification and are both aware of the bus timeout periods. However, it should be realized that other specifications, such as those associated with Personal Computer Memory Card International Association (PCMCIA), CompactFlash (CF), MultiMediaCard (MMC) and Secure Digital (SD) card can be implemented in accordance with the invention.

Generally, in accordance with an embodiment of the present invention, in order to allow a memory system to execute applications or process data for a time period that may exceed the bus timeout of a particular specification, the controller in the memory system deasserts the ready signal and holds the bus to the computer system in a "busy" state until the memory system is about to timeout. During a write operation, the controller receives dummy data blocks from the computer system before the write bus timeout period expires, causing the bus timeout period to be reset. During a read operation, the controller sends dummy data blocks to the computer system before the read bus timeout period expires, causing the bus timeout period to be reset.

As mentioned above, computer system 10 includes application programs 75 stored in memory 45. In this example, at least one application program from application programs 75 is a security application that supports a security application stored in RAM 120 of memory system 100.

Further, program modules 80 includes drivers (or hard-wired logic) that are configured to detect the presence of card services, interface to the card file system (e.g., flash file system), handle calls made to memory services, and monitor bus timeout periods. The drivers (or logic) provide the interface between application programs 75 and memory system 100. Although the method required to access memory system 100 varies depending on the type of memory system (i.e., memory technology) implemented in the memory system, in this particular example, the memory system implements the flash specification. The drivers (or logic) are configured to provide commands to memory system 100, send and receive data to and from memory system 100, and manage bus timeout periods (e.g. write/read) at the physical protocol level. One function of the drivers (or logic) is to monitor the ready signal from memory system 100 and to identify when a particular operation or command has exceeded the bus timeout period. As mentioned above, the ready signal indicates that memory system 100 is ready for the next transaction. If deasserted, the ready signal indicates that the memory system 35 is busy performing a command or an operation and is not ready for the next transaction.

As discussed above, the real problem in system inflexibility occurs when these functions are not entrusted to drivers, but reside at least partly in hardware. (Drivers can be updated, but hardware is not so easy to change.) Various manufacturers have used FPGA or ASIC implementations of SD card or other interface rules, and the legacy equipment which carries these hardware implementations is inflexible.

In the prior art systems, if the application or operation being executed in the memory system is a long process, for example a process that exceeds the write or read bus timeout period specification, the memory system will encounter a bus timeout. Depending on the type of drivers, this typically results in the drivers initiating a reset signal, power cycle, or other recovery process of memory system. In either case, once the drivers recognize a bus timeout, the computer system treats the memory system as no longer functioning properly and the application or operation executing in the memory system is aborted.

Generally, a typical write operation involves a computer sending a write command to a memory and then waiting for an indication from the memory that it is ready to receive the data. The ready indication can be for example, a signal, status, or any other protocol mechanism. Once the memory is ready, it sends an indication to the computer, and in response the computer sends a series of data blocks to the memory. Because the memory is ready, it can receive at least one data block and can trigger, issue, and drive a busy signal between data blocks. The computer monitors the signals from the memory and when the memory is ready, the computer sends data blocks to the memory.

Figure 2:
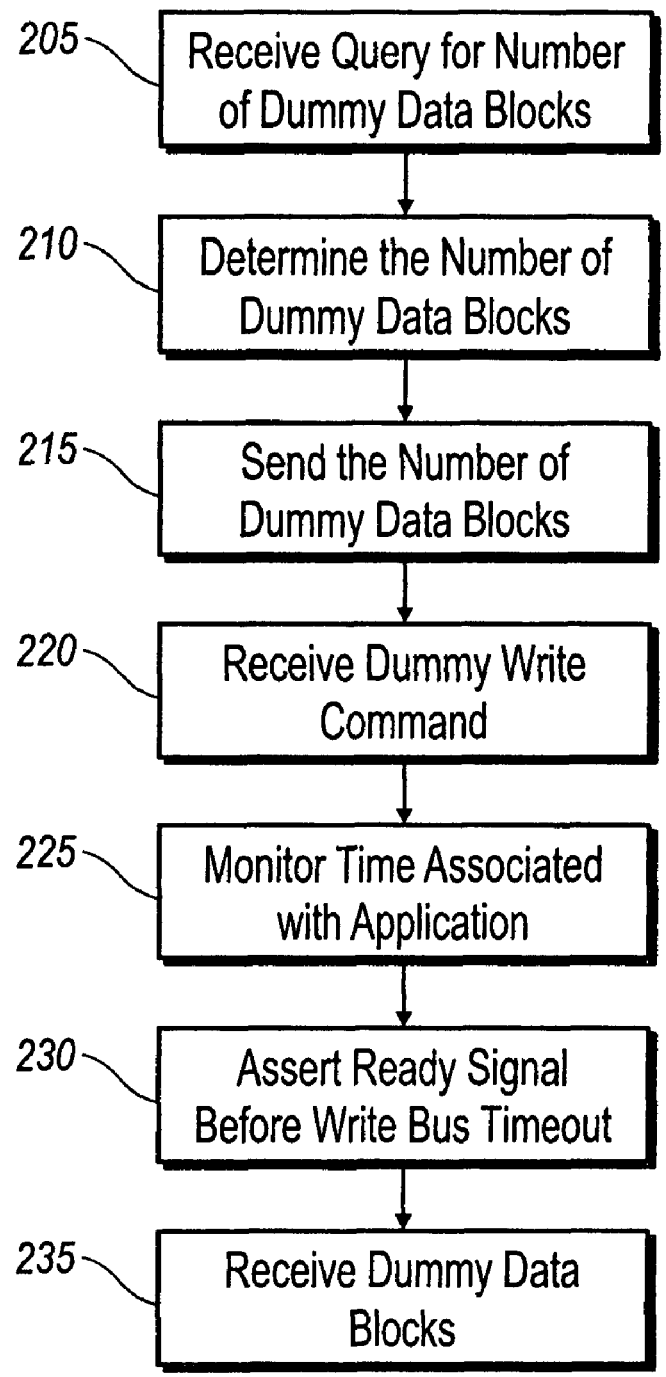
FIG. 2 is a general flowchart illustrating a write operation, in accordance with a sample embodiment.

FIG. 2 is a general flowchart illustrating a write operation in accordance with an embodiment of the present invention. In this exemplary embodiment of the invention, the write operation is executed in the context of a security application stored in computer system 10 and a security application stored in memory system 100. The disclosed use of dummy blocks is suited for preventing bus timeouts for applications that are time consuming. This concept can be helpful for any type application which may need more processing time than the memory system bus timeout specification allows. As mentioned above, the invention is not limited to the type of application executed in memory system 35 and could also apply to file deletion or data compression within the memory system, for example.

Referring back to FIG. 2, in this embodiment of the present invention, at block 205, the application (e.g., security process) in computer system 10 sends a query command to memory system 100. Specifically, the application instructs processor 15 to query memory system 100 for the number of dummy data blocks that the application in computer system 10 should send to memory system 100 to avoid a write bus timeout.

Dummy data blocks are regular data blocks having a sector and block size that depend on the particular specification of memory system 100. Depending on how the dummy data blocks are defined, the data in the dummy data blocks can be irrelevant and thus, can include anything. In this particular embodiment of the present invention, the data in the dummy data blocks is irrelevant. The dummy data blocks can also include identifiers, such as signatures or patterns, in order to distinguish a dummy data block from a valid data block.

Executing instructions stored in RAM 120, controller 105 determines the number of dummy data blocks that the application in computer system 10 should send to memory system 100 in order to prevent a write bus timeout (block 210). Knowing the maximum time needed for the application in memory system 100 to execute and the write bus timeout period specification, controller 105 determines the number of dummy data blocks that the application in computer system 10 has to send to avoid a write bus timeout. In this embodiment of the present invention, controller 105 determines the number of dummy data blocks by dividing the write bus timeout period associated with the memory system specification into the maximum time needed for the application to execute in the memory system.

For example, if the application (e.g. security process) in memory system 35 takes 10 seconds to complete, controller 105 determines the number of dummy data blocks that it will need to receive in order to allow the application to execute without memory system 100 exceeding the write bus timeout period. If the memory system 100 is a SD Card, then by definition the write bus timeout is 250 ms. Knowing this, controller 105 determines that memory system 100 requires four dummy data blocks to hold the bus busy for one second. Given that the application in memory system 100 will take 10 seconds to complete, memory system 100 will have to receive a total of forty dummy data blocks, one dummy data block every 250 ms, to avoid a write bus timeout. It should be noted that identical calculations are made for a read operation, only the read timeout period will likely differ from the write timeout period.

Referring to FIG. 2, knowing the number of dummy data blocks, at block 215, controller 105 sends the number of dummy data blocks to the application in computer system 10. In accordance with the present embodiment of the invention, these communications are initiated at the application level. By communicating at the application level, the drivers can remain off-the-shelf and unchanged.

The application in computer system 10 reads the query results and initiates a dummy write command with the appropriate number of dummy data blocks. The application in computer system 10 sends the dummy write command and the dummy data blocks to memory system 100. At block 220, memory system 100 receives the dummy data block, and the dummy write command directs controller 105 to go into a dummy write state during processing. In this state, controller 105 ignores the dummy data blocks that it receives from the application in computer system 10. As mentioned above, the dummy data blocks are monitored by the drivers in computer system 10 and appear to the drivers as being no different from valid data blocks, thus keeping the drivers from initiating a bus timeout. Subsequently, the dummy write command is received by memory system 100. In response, controller 105, via host interface 130, deasserts the ready signal (i.e., sets the bus to busy) and executes the application in memory system 100.

At block 225, controller 105 monitors the time period associated with the execution of the application. For example, when the dummy write command is received, controller 105 invokes timer 115 so that it can monitor the bus timeout period for the write operation. In this particular example, memory system 100 is based on the SD specification, so the write bus timeout period is 250 ms. At block 230, before the write bus timeout period is exceeded, timer 115 causes a timeout expiration interrupt which interrupts processor 110 and causes the host interface 130 to assert the ready signal. Recognizing the ready signal, the drivers in computer system 10 initiate the transfer of the next dummy data block to memory system 100, thus preventing a write bus timeout. At block 235, memory system 100 receives and ignores the dummy data block.

As mentioned above, the drivers are unaware of the difference between the dummy data blocks and the valid data blocks. The drivers monitor the transfer of the dummy data block and recognize that a transfer occurred within the write bus timeout period and do not initiate a write bus timeout. This allows the application in memory system 100 to continue to execute without a bus timeout interruption. On a new dummy data block arrival, a new dummy data block interrupt invokes timer 115 and interrupts processor 105 before the write bus timeout period expires. Subsequently, controller 105 executes the application without memory system 100 being reset or sent into a recovery process.

The timeout expiration interrupt and the new dummy data block arrival interrupt are invoked in parallel to processor 110 executing the application in memory system 100. The two interrupts continue in a cycle while the application is executed. Once memory system 100 completes its internal process, the remaining dummy data blocks sent by computer system 10 are collected by the memory system 100 with no delay between dummy data blocks. The delay time between two dummy data blocks can be parameter controlled and can vary among applications and memory system specification.

Generally, a typical read operation involves a computer system sending a read command to a memory system and then waiting for an indication from the memory system that it is ready to send the data. As mentioned above, the ready indication can be for example, a signal, status, or any other protocol mechanism. Once the memory system is ready, it sends a series of data blocks to the computer system. Because the memory system is ready, it can send at least one data block and can trigger, issue, and drive a busy signal between data blocks.

Figure 3:
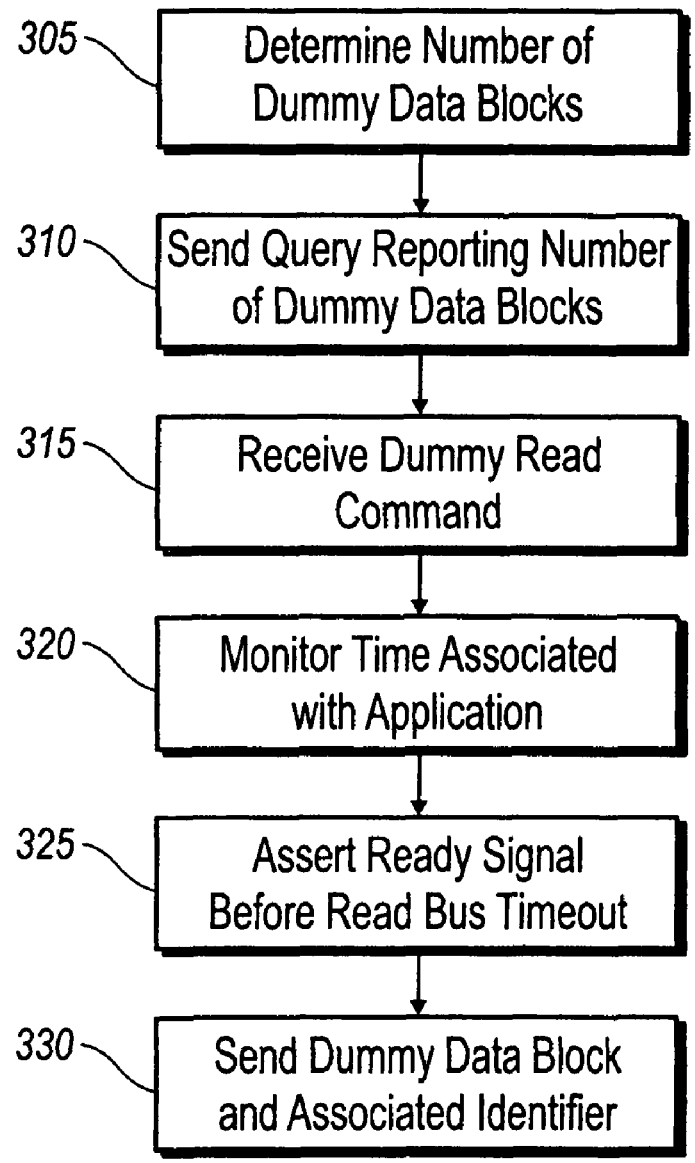
FIG. 3 is a general flowchart illustrating a read operation in accordance with a sample embodiment.

FIG. 3 is a flowchart illustrating a read operation in accordance with an embodiment of the present invention. In this exemplary embodiment of the invention, the read operation is executed in the context of a security application stored in memory system 100 and a security application stored in computer system 10. As in the write example, the invention is suited for preventing bus timeouts for applications that are time consuming. Thus, any type of application in memory system 10 that may need more processing time than the memory system specification allows for during a read operation, is applicable. As mentioned above, the invention is not limited to the type of application executed in memory system 100 and could also apply to file deletion or data compression within the memory system, for example.

In this embodiment of the present invention, at block 305, controller 105, executing instructions stored in RAM 120, determines the number of dummy data blocks that system memory 35 should send to computer system 10 to prevent a read bus timeout. Knowing the maximum time needed for the application in memory system 100 to execute and the read bus timeout period specification, controller 105 determines the number of dummy data blocks that the application should send to avoid a read bus timeout. In this embodiment of the present invention, controller 105 determines the number of dummy data blocks by dividing the read bus timeout period associated with the memory system specification into the maximum time needed for the application to execute in the memory system.

For example, if the application (e.g., security process) in memory system 100 takes 10 seconds to complete, controller 105 determines the number of dummy data blocks that it will need to send to the application in computer system 10 to prevent a read bus timeout. If memory system 100 is a SD Card, then by definition the read bus timeout is 100 ms. Knowing this, controller 105 determines that memory system 100 requires ten dummy data blocks to hold the bus busy for one second. Given that the application in memory system 100 will take 10 seconds to complete, memory system 100 will have to send a total of 100 dummy data blocks, one dummy data block every 100 ms, to avoid a read bus timeout.

As in the write example, the number of dummy data blocks represents the quantity of dummy data blocks needed for the drivers in computer system 10 to monitor in order to prevent the drivers from initiating a read bus timeout, during the execution of the application in memory system 100.

Knowing the number of dummy data blocks, at block 310, the application (e.g., security process) in memory system 100 sends a query command to computer system 10. Specifically, the application in memory system 100 instructs controller 105 to send a query command to computer system 10. The query command reports to computer system 10 the number of dummy data blocks to expect from memory system 100 to avoid a read bus timeout during the execution of the read command. As mentioned above, these communications are initiated at the application level, thus allowing for the drivers to remain off-the-shelf and unchanged.

The application in computer system 10 reads the query results from memory system 100 and initiates a dummy read command. The application in computer system 10 sends the dummy read command to system memory 100. At block 315, memory system 100 receives the dummy read command and directs controller 105 to go into a dummy read state during processing. In this state, controller 105 sends the dummy data blocks to computer system 10 before the expiration of the read bus timeout period. As mentioned above, these dummy data blocks are monitored by the drivers in computer system 10 and appear to the drivers as being no different from valid data blocks. When the dummy read command is received by system memory 100, controller 105 deasserts the ready signal (i.e., sets the bus to busy).

At block 320, controller 105 monitors the time period associated with the execution of the application. For example, when the dummy read command is received, controller 105 invokes timer 115 so that it can monitor the bus timeout period for the read operation in memory system 100. In this particular example, memory system 100 is based on the SD specification, so the read bus timeout period is 100 ms. At block 325, before the read bus timeout period is exceeded, timer 115 causes a timeout expiration interrupt which interrupts processor 110 and causes host interface 130 to assert the ready signal.

Subsequently, at block 330, controller 105 sends a dummy data block with a signature to the application in computer system 10. The signature allows for the application in computer system 10 to distinguish the dummy data blocks from the valid data blocks. Recognizing the signature, the application in the computer system 10 can ignore the dummy data blocks.

The drivers in computer system 10 monitor the transfer of the dummy data block and recognize that a transfer occurred within the read bus timeout period and, thus, do not initiate a read bus timeout. As mentioned above, the drivers are unaware of the difference between the dummy data blocks and the valid dummy blocks. The application in computer system 10 receives the dummy data block, recognizes the signature associated with the dummy data block, and ignores the dummy data block.

Upon sending a new dummy data block, a new data block sent interrupt invokes timer 115 that interrupt processor 110 before the read bus timeout period expires, allowing for controller 105 to execute the application without memory system 100 being reset or sent into a recovery process.

The timeout expiration interrupt and the new dummy data block sent interrupt are invoked in parallel to processor 105 executing the application in memory system 100. The two interrupts continue in a cycle while the application is executed. The delay time between two dummy data blocks can be parameter controlled and can vary among applications and memory system architectures.

According to various disclosed embodiments, there is provided: A method for interfacing between a host system and a detachable electronic module containing secure-access memory, comprising the actions of: a) when a commanded write requires secure storage operations in the detachable module, performing a series of dummy writes, which is long enough to allow the detachable module to complete the secure storage operations without bus timeout; and b) when a commanded read requires cryptographic operations in order for the desired data to be assembled, then performing dummy read cycles to avoid timeout; whereby complex procedures can be overlaid onto a legacy bus architecture.

According to various disclosed embodiments, there is provided: A method for interfacing between a host system and a data module, comprising the actions of: a) when a commanded write cycle requires a complex computation for completion, then writing dummy blocks with time delays therebetween to avoid timeout, until said complex computation is finished; and b) when a commanded read cycle requires a complex computation for completion, then performing dummy reads with time delays therebetween to avoid timeout, until said complex computation is finished.

According to various disclosed embodiments, there is provided: A method for interfacing between a system and a detachable electronic module containing memory, comprising the actions of: a) when a complex processing operation is required during a write cycle, writing dummy blocks to avoid timeout; and b) when a complex processing operation is required during a read cycle, performing dummy reads to avoid timeout; whereby complex procedures can be overlaid onto a legacy bus architecture.

According to various disclosed embodiments, there is provided: A method for avoiding bus timeouts between a computer system and a memory system, the method comprising: determining a number of dummy data blocks needed for an application in the memory system to execute without a write bus timeout period occurring; making the number of dummy data blocks known to the computer system; receiving a dummy write command from the computer system initiating a state where the memory system ignores the dummy data blocks; indicating to the computer system that the memory system is busy; executing the application in the memory system; monitoring a time period associated with the executing of the application in the memory system; indicating that the memory system is ready before the time period exceeds the write bus timeout period; and receiving a dummy data block from the computer system.

According to various disclosed embodiments, there is provided: A method for interfacing to a host system, implemented in a detachable electronic module containing secure-access memory, comprising the action of: when a commanded read requires cryptographic operations in order for the desired data to be assembled, then performing dummy read cycles to avoid timeout, until valid data is assembled and read out; whereby complex procedures can be overlaid onto a legacy bus architecture.

According to various disclosed embodiments, there is provided: A method for interfacing to a secure data module, comprising the action of: when a commanded write cycle requires a complex computation for completion, then writing dummy blocks with time delays therebetween to avoid timeout, until said complex computation is finished; and discarding said dummy blocks, at least by the time said computation has finished and the commanded write cycle has been completed.

According to various disclosed embodiments, there is provided: A method for avoiding bus timeouts between a computer system and a memory system, the method comprising: determining a number of dummy data blocks needed for an application in the memory system to execute without a read bus timeout period occurring; making the number of dummy data blocks known to the computer system; indicating to the computer system that the memory system is busy; executing the application in the memory system; monitoring a time period associated with the executing of the application in the memory system; indicating that the memory system is ready before the time period exceeds the read bus timeout period; and sending a dummy data block and an identifier to the computer system.

According to various disclosed embodiments, there is provided: A system for avoiding bus timeouts between a computer system and a memory system, the memory system comprising: a memory cell array; and a controller connected to the memory cell array, the controller configured to perform: determining a number of dummy data blocks needed for an application in the controller to execute without a write bus timeout period occurring; making the number of dummy data blocks known to the computer system; receiving a dummy write command from the computer system initiating a state where the controller ignores the dummy data blocks; indicating to the computer system that the memory system is busy; executing the application in the controller; monitoring a time period associated with the executing of the application in the controller; indicating that the memory system is ready before the time period exceeds the write bus timeout period; and receiving a dummy data block from the computer system.

According to various disclosed embodiments, there is provided: A system for avoiding bus timeouts between a computer system and a memory system, the memory system comprising: a memory cell array; and a controller connected to the memory cell array, the controller configured to perform: determining a number of dummy data blocks needed for an application in the controller to execute without a read bus timeout period occurring; making the number of dummy data blocks known to the computer system; indicating to the computer system that the memory system is busy; executing the application in the controller; monitoring a time period associated with the executing of the application in the controller; indicating that the memory system is ready before the time period exceeds the read bus timeout period; and sending a dummy data block and an identifier to the computer system.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The foregoing embodiments merely illustrate a few sample implementations of the innovative principles. It will thus be appreciated that those skilled in the art will be able to devise numerous other arrangements, which embody the principles of the invention and are, thus, within its sprit and scope.

For example, based on the disclosure, it is apparent that the principles of the invention can readily accommodate the several existing standards or specifications for such removable cards that are being used for flash memory with an internal controller. One such standard, the PC Card Standard, provides specifications for three types of PC Cards. The PC Card Standard is a product of the Personal Computer Memory Card International Association (PCMCIA). The CompactFlash card (CF card) is functionally compatible with the PC Card but is much smaller. An even smaller non-volatile memory card is the MultiMediaCard (MMC). A modified version of the MMC card having about the same size is the later Secure Digital (SD) card. Standards or specifications exist for these and other electronic cards that are suitable for use as memory cards. Some of these standards are available to any member of the public, and others to members of associations formed to utilize the cards.

Flash EEPROM systems are being applied to a number of applications, particularly when packaged in an enclosed card that is removably connected with a computer system or host system. Current commercial memory card formats include that of the Personal Computer Memory Card International Association (PCMCIA), CompactFlash (CF), MultiMediaCard (MMC) and Secure Digital (SD). One supplier of these cards is SanDisk Corporation, assignee of this application. Computer system or host systems with which such cards are used include personal computers, notebook computers, hand held computing devices, cameras, audio reproducing devices, and the like. Flash EEPROM systems are also utilized as bulk mass storage embedded in host systems.

Figure 1B:
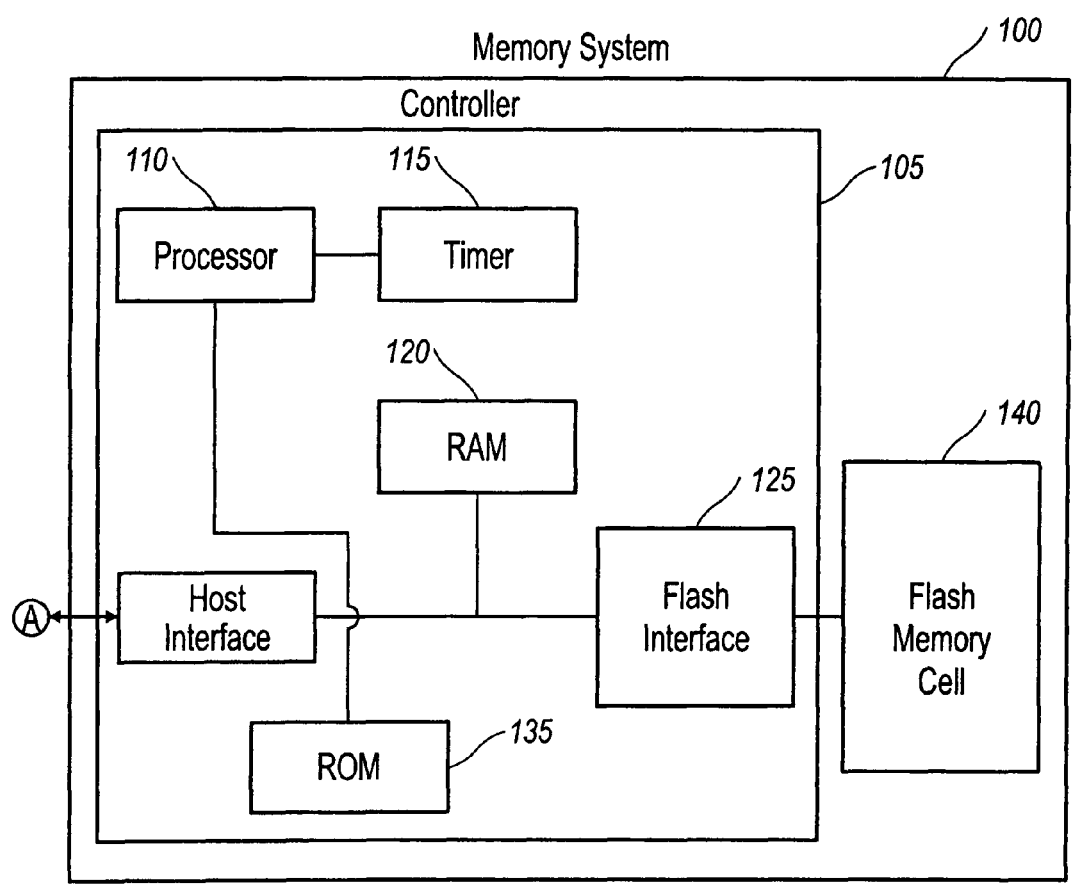

The memory system shown in FIG. 1(b) can be embedded as part of a computer system or packaged into a card, such as a card following one of the card standards previously mentioned. In the case of a card, the bus terminates in external terminals on the card for mating with a complementary socket within computer system or a host system. Although use of one controller chip and multiple memory chips is typical, the trend is, of course, to use fewer separate chips for such a system by combining their circuits.

In another example, computer system 10 may be a personal computer, digital camera, personal digital assistant, cellular telephone, digital audio player or other electronic system having a need for such a non-volatile memory system. Memory system 100 may be embedded within computer system 10, and thus made part of the computer system, or in the form of a card that is electrically and mechanically removably connected with the computer system.

Further, the system is disclosed in a form in which various functions are performed by discrete functional blocks. However, any one or more of these functions could equally be embodied in an arrangement in which the functions of any one or more of those blocks are realized by one or more appropriately programmed processing devices running software programs stored in various mediums or having functions programmed in firmware.

In other possible implementations of the invention, the bus to which a memory module connects can be, for example, an SPI bus, a 1-bit or 4-bit SD card bus, an MMC bus, or other bus. Similarly, the module which is interfacing to the host does not have to be SD, but can be in CF or a wide variety of other formats.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for a memory system to avoid bus timeouts, the memory comprising:
   determining whether a time period required for the memory system to execute an application exceeds a bus timeout period for the memory system; and
   when it is determined that the time period exceeds the bus timeout period for the memory system:

determining a number of dummy data blocks needed for the application to execute without a bus timeout occurring;

communicating the determined number through the memory system bus to a computer system;

monitoring a time period of executing the application in the memory system; and indicating to the computer system before the monitored time period exceeds the bus timeout period that the memory system is in a ready state for communicating a dummy data block between the memory system and the computer system.

2. The method of claim 1, further comprising receiving a query from the computer system for the determined number of dummy data blocks.

3. The method of claim 1, wherein determining the number of dummy data blocks needed for the application comprises dividing a write bus timeout period of the memory system into a maximum time needed for the application to execute in the memory system.

4. The method of claim 1, wherein determining the number of dummy data blocks needed for the application by dividing a read bus timeout period of the memory system into a maximum time needed for the application to execute in the memory system.

5. The method of claim 1, further comprising:

monitoring the time period for executing the application; and signaling a controller of the memory system at a time before the bus timeout period.

6. The method of claim 1, wherein the application comprises a digital content protection security process that prevents the free distribution of copyrighted content.

7. The method of claim 1, wherein the bus timeout period comprises a bus timeout period from one of the following specifications: Personal Computer Memory Card International Association (PCMCIA), CompactFlash (CF®), MultiMediaCard (MMC®) and Secure Digital (SD).

8. The method of claim 1, wherein the dummy data block includes a signature identifying the dummy data block as a block to be ignored.

9. A method for avoiding bus timeouts between a computer system and a memory system, comprising:

determining whether a time period for executing a processing operation to completion will exceed a bus timeout period of the memory system;

timing the processing operation; and before the bus timeout period expires and before the processing operation has completed, indicating to the computer system that the memory system bus is in a ready state for communicating a dummy data block between the memory system and the computer system.

10. The method of claim 9, wherein indicating to the computer system that the memory system bus is in a ready state for communicating a dummy data block comprises sending a query to the computer system indicating a number of data blocks that are to be communicated between the computer system and the memory system to avoid the bus timeout period.

11. The method of claim 10, wherein the number of dummy data blocks is associated with the time period.

12. The method of claim 10, wherein the number of dummy data blocks is determined by dividing the bus timeout period into the time period for executing the processing operation to completion.

13. The method of claim 9, wherein the bus timeout period is a bus read timeout period from one of the following specifications: Personal Computer Memory Card International Association (PCMCIA), CompactFlash (CF®), MultiMediaCard (MMC®) and Secure Digital (SD).

14. A memory system comprising:

a memory system bus; and a controller, in communication with the memory system bus, that:

determines whether a time period required for the memory system to execute an application exceeds a bus timeout period for the memory system, and when the controller determines that the time period exceeds the bus timeout period for the memory system:

determines a number of dummy data blocks needed for the application to execute without a bus timeout occurring;

communicates the determined number through the memory system bus to a computer system;

monitors a time period of executing the application in the controller;

indicates to the computer system before the monitored time period exceeds the bus timeout period that the memory system bus is in a ready state for communicating a dummy data block between the memory system and the computer system.

15. The system of claim 14, wherein the controller receives a query from the computer system for the determined number of dummy data blocks.

16. The system of claim 14, wherein the controller determines the number of dummy data blocks needed by dividing a write bus timeout period of the memory system into a maximum time needed for the application to execute in the controller.

17. The system of claim 14, further comprising a timer to monitor the time period for executing the application and to signal the controller at a time before the bus timeout period.

18. The system of claim 14, wherein the application comprises a digital content protection security process that prevents the free distribution of copyrighted content.

19. The system of claim 14, wherein the controller determines the number of dummy data blocks needed by dividing a read bus timeout period of the memory system into a maximum time needed for the application to execute in the memory system.

20. The system of claim 14, wherein the bus timeout period comprises a bus timeout period from one of the following specifications: Personal Computer Memory Card International Association (PCMCIA), CompactFlash (CF®), MultiMediaCard (MMC®) and Secure Digital (SD).

21. The system of claim 14, wherein the dummy data block includes a signature identifying the dummy data block as a block to be ignored.

22. A system for avoiding bus timeouts between a computer system and a memory system, comprising:

a memory system bus;

a controller, in communication with the memory system bus, that determines whether a time period for executing a processing operation to completion will exceed a bus timeout period of the memory system;

a timer that times the processing operation and communicates a signal to the controller at a time before the bus timeout period expires and before the processing operation has completed;

wherein the controller, upon receiving the signal, indicates to the computer system that the memory system bus is in a ready state for communicating a dummy data block between the memory system and the computer system, before the processing operation has completed.

23. The system of claim 22, wherein the controller sends a query to the computer system indicating a number of data blocks that are to be communicated between the computer system and the memory system to avoid the bus timeout period.

24. The system of claim 23, wherein the number of dummy data blocks is associated with the time period.

25. The system of claim 23, wherein the number of dummy data blocks is determined by dividing the bus timeout period into the time period for executing the processing operation to completion.

26. The system of claim 23, wherein the bus timeout period is a bus read timeout period from one of the following specifications: Personal Computer Memory Card International Association (PCMCIA), CompactFlash (CF®), MultiMediaCard (MMC®) and Secure Digital (SD).

* * * * *